(12) United States Patent
Boppart et al.

(10) Patent No.: US 12,385,837 B2
(45) Date of Patent: Aug. 12, 2025

(54) DIGITAL DOMAIN PHOTON PEAK EVENT DETECTION SYSTEM AND METHOD

(71) Applicant: The Board of Trustees of the University of Illinois, Urbana, IL (US)

(72) Inventors: Stephen Boppart, Champaign, IL (US); Janet Sorrells, Champaign, IL (US); Rishyashring Raman Iyer, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 395 days.

(21) Appl. No.: 17/836,146

(22) Filed: Jun. 9, 2022

(65) Prior Publication Data

US 2022/0397530 A1 Dec. 15, 2022

Related U.S. Application Data

(60) Provisional application No. 63/208,947, filed on Jun. 9, 2021.

(51) Int. Cl.
*G01N 21/64* (2006.01)
*G02B 21/16* (2006.01)
*G06T 1/20* (2006.01)

(52) U.S. Cl.
CPC ..... *G01N 21/6458* (2013.01); *G01N 21/6402* (2013.01); *G01N 21/6408* (2013.01); *G02B 21/16* (2013.01); *G06T 1/20* (2013.01); *G01N 2201/06113* (2013.01); *G06T 2207/10056* (2013.01)

(58) Field of Classification Search
CPC .......... G01N 21/6458; G01N 21/6402; G01N 21/6408; G01N 2201/06113; G02B 21/16; G02B 21/0076; G02B 21/0084; G06T 1/20; G06T 2207/10056; G06V 10/94
See application file for complete search history.

(56) References Cited

U.S. PATENT DOCUMENTS 10,250,434 B2 4/2019 Oda

OTHER PUBLICATIONS

Wu, G., Nowotny, T., Chen, Y. and Li, D.D.U., 2016. GPU acceleration of time-domain fluorescence lifetime imaging. Journal of Biomedical Optics, 21(1), pp. 017001-017001.*

(Continued)

*Primary Examiner* — Zhitong Chen
(74) *Attorney, Agent, or Firm* — Greer, Burns & Crain, Ltd.; Steven P. Fallon

(57) ABSTRACT

A photon peak event detection system accepts an analog output from a photon sensor, directly digitizes the analogy output and includes a graphics processing unit (GPU) programmed to conduct a photon peak event detection in real-time via a photon count program that analyzes the digitized photon sensor output in sampling periods each having at least three consecutive data points to determine a local maximum among the consecutive data points and compare the local maximum to one or more predetermined thresholds to determine whether or not a photon was received in each sampling period, the algorithm providing photon counts to a phasor analysis program in the GPU. The phasor analysis program calculates pixelwise fluorescence lifetime phasor data in real-time and sends the data to a central processing unit.

27 Claims, 11 Drawing Sheets

(56) References Cited

OTHER PUBLICATIONS

Xiao, D., Zang, Z., Sapermsap, N., Wang, Q., Xie, W., Chen, Y. and Li, D.D.U., 2021. Dynamic fluorescence lifetime sensing with CMOS single-photon avalanche diode arrays and deep learning processors. Biomedical Optics Express, 12(6), pp. 3450-3462.*
Kim, B., Park, B., Lee, S. and Won, Y., 2016. GPU accelerated real-time confocal fluorescence lifetime imaging microscopy (FLIM) based on the analog mean-delay (AMD) method. Biomedical Optics Express, 7(12), pp. 5055-5065.*
Moon et al., "Analog mean-delay method for high-speed fluorescence lifetime measurement", Optics Express, 2009, pp. 2834-2849, vol. 17, No. 4, OSA.
Eibl et al., "Single pulse two photon fluorescence lifetime imaging (SP-FLIM) with MHz pixel rate", Biomedical Optics Express, 2017, pp. 3132-3142, vol. 8, No. 7, Biomedical Optics Express.
Bower et al., "High-speed imaging of transient metabolic dynamics using two-photon fluorescence lifetime imaging microscopy", Optica, 2018, pp. 1290-1296, vol. 5, No. 10, Optical Society of America.
Bruschini et al., "Single-photon avalanche diode imagers in biophotonics: review and outlook", Light: Science & Applications, 2019, pp. 1-28, Official Journal of the CIOMP 2047-7538.
Hirvonen et al., "Fast Timing Techniques in FLIM Applications", Frontiers in Physics, 2020, pp. 1-20, vol. 8, Article 161, Frontiers in Physics.

\* cited by examiner

DIGITAL DOMAIN PHOTON PEAK EVENT DETECTION SYSTEM AND METHOD

PRIORITY CLAIM AND REFERENCE TO RELATED APPLICATION

The application claims priority under 35 U.S.C. § 119 and all applicable statutes and treaties from prior U.S. provisional application Ser. No. 63/208,947 which was filed Jun. 9, 2021 and is incorporated by reference herein.

STATEMENT REGARDING FEDERALLY SPONSORED RESEARCH OR DEVELOPMENT

This invention was made with government support under R01CA241618 awarded by the National Institutes of Health and DGE-1746047 awarded by the National Science Foundation. The United States Government has certain rights in the invention.

FIELD

A field of the invention is photon detection from photon sensors, such as such as single-photon avalanche photodiodes (SPADs), photomultiplier tubes (PMTs), and hybrid photodetectors (HPDs).—A particular application of the invention is to photon fluorescence lifetime imaging microscopy (FLIM), including confocal and/or two photon laser scanning FLIM. Generally, methods and systems of the invention can digitally count photons from any analog output photon sensor.

BACKGROUND

PMTs remain used despite their analog output because of their sensitivity, which allows them to record output in response to a single photon. In addition, while PMTs inherently produce an analog output as the results of their internal multiple dynode amplification cascade, most commonly used PMTs have built-in analog electronic circuits (CFD) to count photons and output TTL pulses for photon counts. State-of-the art microscopy systems such as scanning electron microscopy systems and fluorescence lifetime imaging microscopy (FLIM) systems therefore use PMTs instead of solid-state detectors.

FLIM is an optical imaging technique that characterizes the fluorescence profile of each pixel within an image by the average time between optical excitation and fluorescence emission, termed the fluorescence lifetime. Fluorescence lifetime is sensitive to the local nanoscale environment and depends on factors such as fluorophore-protein interactions, pH, ion concentration, and temperature, thus providing much more detailed information about a sample than fluorescence intensity, which is often reported in arbitrary units. FLIM has been used in diverse applications, and notably has shown promising results for label-free characterization of reduced nicotinamide adenine dinucleotide and reduced nicotinamide adenine dinucleotide phosphate (NAD(P)H) in a wide variety of biological specimens and diseases.

Two-photon FLIM is a widely used technique in biomedical optical imaging. State-of-the-art FLIM systems estimate the fluorescence lifetime by electronically correlating the PMTs current/thresholded-digital output with a reference clock signal electronically. Time-domain FLIM systems are limited by long acquisition and postprocessing times that decrease data throughput and inhibit the ability to image fast sub-second processes.

On the acquisition side, there are two kinds of FLIM techniques. Time-domain FLIM, which uses a pulsed laser, and frequency-domain FLIM, which can use either a continuous-wave or pulsed laser with external modulation. Both techniques have comparable speeds "commercially", although time-domain FLIM techniques have better performance in a given time without averaging. Time-domain acquisition FLIM needs photon detectors with single-photon sensitivity and needs the estimation of photon arrival times with respect to the excitation laser pulses. Typically, the most common technique for counting photons and estimating their arrival times is using time-correlated single photon counting (TCSPC). TCSPC uses a detector with single-photon sensitivity, i.e., a PMT, HPD, or a SPAD, a constant-fraction discriminator that can distinguish between photon (s) and noise, a time-to-amplitude converter which involves an electronic correlator with respect to a reference clock signal from a laser, and a digitizer that samples and records photon counts and their arrival times, or a combination of these components thereof, such as combining the last two components into a time-to-digital converter. These electronics have a "dead time" in which no other incident photon can be counted of 10-100 ns, though recently single ns-level dead time has been achieved with advanced TDCs. If two photons arrive shortly one after the other and the second photon arrives during the dead time, the second incident photon is not counted, and the photons vs. time curve is biased (called the "pile up effect"), which leads to inaccurate fluorescence lifetime estimation. To prevent this pile up, the rate of photon arrival at the detector is typically slowed (via lower excitation power, optical filters, etc). Thus, dead time greatly limits how fast FLIM images can be acquired, which is a barrier to many fast applications and clinical problems. In most TCPSC systems, the acceptable photon rate (% of excitation pulses that result in a photon being detected) is limited to 5-10% in order to create an accurate photon counts vs. time curve.

The most common detection method for two-photon FLIM is time-correlated single photon counting (TCSPC), which generally uses a photomultiplier tube (PMT) for fluorescence detection. This technique involves a detector, generally a PMT, a constant fraction discriminator, that discriminates between a single-photon signal and noise, and then either a time to amplitude converter and digitizer or a time to digital converter (TDC). TCSPC requires the time to amplitude converter to operate. In TCSPC, analog electronics (a CFD (constant fraction discriminator) followed by a TAC (time to amplitude converter) and an ADC) are used to time tag and count photons. Analog electronics have finite bandwidth an impart dead time. The ADC also has a limited bandwidth and sampling rate that dictate how well the analog data is represented in the digital domain. Typical TCSPC analog electronics have a "dead time" in which no other incident photon can be counted of 10-100 ns, though recently single ns-level dead time has been achieved with advanced TDCs. If two photons arrive shortly one after the other and the second photon arrives during the dead time, the second incident photon is not counted, and the photons vs. time curve is biased (called the "pile up effect"), which leads to inaccurate fluorescence lifetime estimation. To prevent this pile up, the rate of photon arrival at the detector is typically slowed (via lower excitation power, optical filters, etc). Thus, dead time greatly limits how fast FLIM images can be acquired, which is a barrier to many fast applications and clinical problems. In most TCPSC systems, the acceptable photon rate (% of excitation pulses that result in a photon being detected) is limited to 5-10% in order to create an accurate photon counts vs. time curve.

Since the dead time for a single sensor is high, innovations for FLIM detectors have focused on arrays of SPADs (single-photon avalanche diode) and PMTs, which are equivalent to several individual sensors packed together geometrically, to increase the maximum photon-rate capability relative to a single-sensor setup. Such arrays suffer from a relatively higher dark count rate and lower quantum efficiency (QE) over the visible spectrum, in part due to their low fill factor, which often creates the need for extensive frame averaging.

Techniques for fluorescence lifetime estimation and analysis include least squares fitting of a single- or multi-exponential decay, and phasor analysis. Phasor analysis for fluorescence lifetime estimation is one of the fastest and most useful FLIM analysis techniques. In terms of algorithm complexity, a single-exponential decay fit and phasor analysis are both linear problems, whereas a multi-exponential decay fit requires an iterative nonlinear least squares method. However, unlike a single-exponential fit, phasor analysis can also be used to analyze multi-exponential decays by decomposing a multi-exponential decay into a two-component basis of two frequency components, g and s, that are used to calculate the mean fluorescence lifetime. These components can be visualized on a 2D polar plot which is easily interpretable for a familiar user. Fluorescence lifetime estimation is often done in post-processing and can be extremely resource intensive due to large file sizes and complicated fitting algorithms.

Acceleration of different image processing algorithms has been achieved with the parallel computing capabilities of graphics processing units (GPUs) for a variety of biomedical imaging modalities. Despite their computational speed, GPUs have not yet been widely employed for real-time FLIM processing and visualization, though some initial promising results have been reported for a variety of fluorescence lifetime estimation techniques, and also specifically for the AMD method. See, Wu et al., "GPU acceleration of time-domain fluorescence lifetime imaging," J. of Biomedical Optics, 21(1), 017001 (2016). The Wu et al method used GPU acceleration for fluorescence lifetime estimation from photon counts vs. time data collected using TCSPC. Another method is described in Kim et al., "GPU accelerated real-time confocal fluorescence lifetime imaging microscopy (FLIM) based on the analog mean-delay (AMD) method," Biomedical Optics Express Vol. 7, Issue 12, pp. 5055-5065 (2016). This method employed a technique called the "analog mean-delay" method, in which "the fluorescence lifetime can be extracted from the analog fluorescence pulse signal"—similar to direct pulse sampling methods that do not have single-photon specificity. GPU-accelerated processing to compute their AMD-based fluorescence lifetime from directly digitized data, bypassing TCSPC analog electronics. This technique calculates fluorescence lifetime from directly digitized data, but does not calculate photon counts.

Most detectors with single-photon sensitivity, such as PMTs, HPDs, and SPADs, convert and amplify the optical signals into electrical ones. Due to operating under high gain conditions, a single incident photon creates a large current output. The peak current for a single photon shows very large variance due to the stochastic nature of the amplification process. When the current output signal is used directly for creating the intensity vs time histogram of exponential decay (termed "direct pulse sampling"), or in phasor analysis, there is a large discrepancy between the weight of each photon leading to larger errors in fluorescence intensity and lifetime estimation. Moreover, the current profile of PMTs, HPDs, and SPADs has a finite width, typically 1-10 ns, biasing any fluorescence lifetime estimation to a higher value. Consequently, constant fraction discrimination, which uses a threshold at the positive slope of the current profile to discriminate between 1 and 0 photons, is popularly used and performs well when photons arrive far and few in between (sparsely) to localize and standardize them more precisely. However, if two incident photons arrive exactly or close together, within a few nanoseconds of each other, the output current is not guaranteed to be linear and the current profile is also expected to have less precision in time, creating errors both in counting photons and estimating their arrival times. All these factors limit the maximum photon rate of photons in FLIM for accurate estimations of fluorescence lifetime values.

SUMMARY OF THE INVENTION

A preferred embodiment provides a photon peak event detection system that accepts an analog output from a photon sensor, directly digitizes the analog output and includes a graphics processing unit (GPU) programmed to conduct a photon peak event detection in real-time via a photon count program that analyzes the digitized photon sensor output in sampling periods each having at least three consecutive data points to determine a local maximum among the consecutive data points and compare the local maximum to one or more predetermined thresholds to determine whether or not a photon was received in each sampling period, the algorithm providing photon counts to a phasor analysis program in the GPU. The phasor analysis program calculates pixelwise fluorescence lifetime phasor data in real-time and sends the data to a central processing unit.

DETAILED DESCRIPTION OF THE PREFERRED EMBODIMENTS

Figures 1A, 1B:
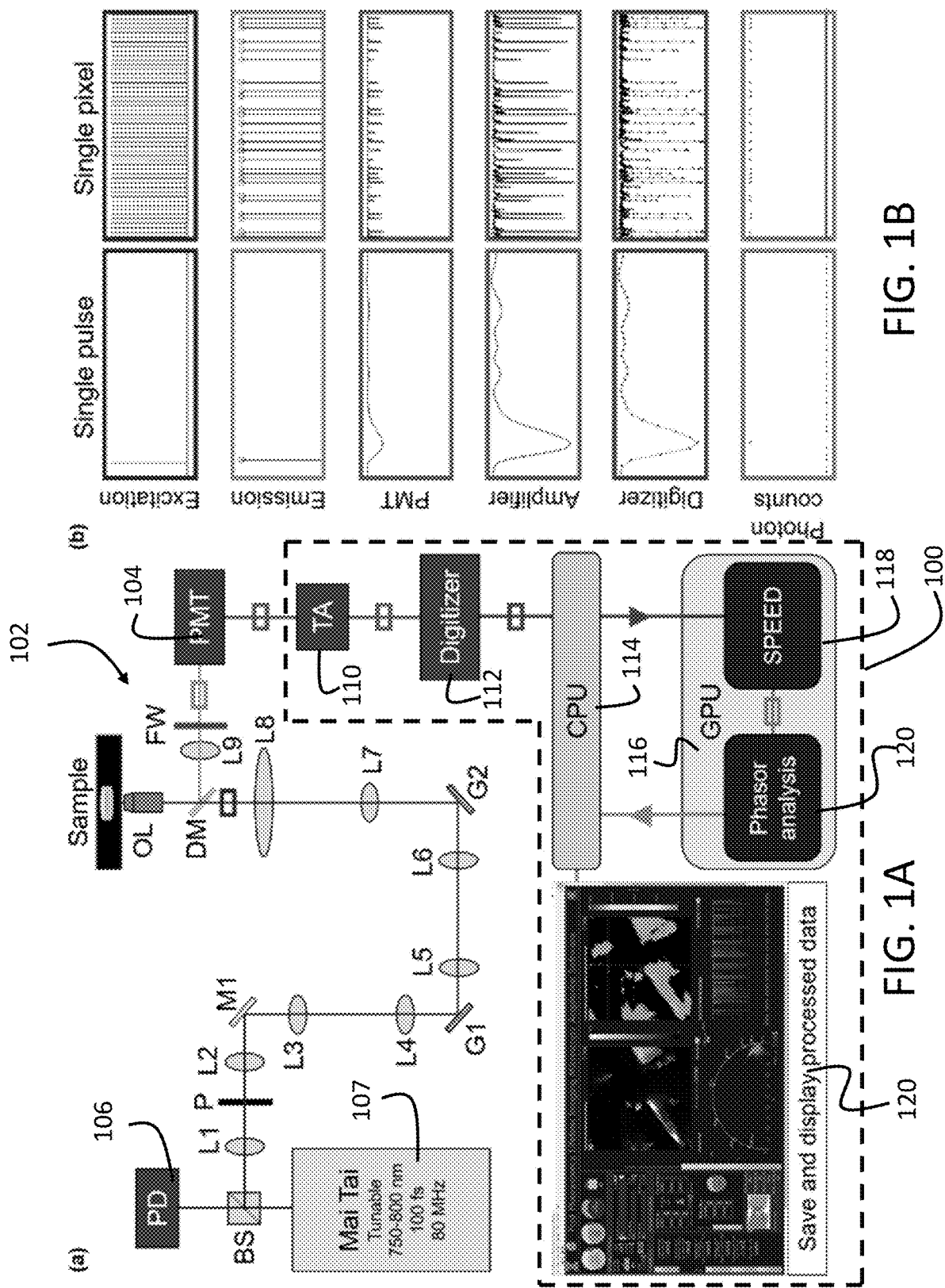
FIGS. 1A and 1B illustrate a preferred embodiment single-photon peak even detection sy stem.

A preferred embodiment single-photon peak event detection system accepts an analog output from a photon sensor with single-photon sensitivity,. The system directly digitizes this output using electronics that are time synchronized with an excitation pulse that causes signals in the photon sensor. Collection and digitization of photon sensor output can be conducted in the GHz range while retaining single-photon specificity. Systems and methods of the invention include processing units programmed to computationally count photons in the digitized PMT output with an effective dead time that is as low as twice the sampling period, which allows immediate recovery (e.g., <1 ns) and is much lower than TCSPC techniques, which will miss photons that can be detected by the present invention because of much longer dead times and longer sampling periods. The sampling period of preferred embodiments can be as small as three data points that consist of a data point being considered and immediate previous and immediate subsequent data points, which permits determination of a local maximum and a decision on whether a data point exceeded a threshold to indicate reception of a single photon. For higher accuracy in noisier environments additional data points can be used, e.g., two data points immediately before and immediately after a data point being considered. This will increase dead time, but still allow recovery in a much smaller period than TCSPC techniques. Compared to TCSPC techniques, the present thresholded peak detection of directly digitized detector output bypasses the use of a CFD (constant fraction discriminator) followed by a TAC (time to amplitude converter), which have finite bandwidth and add to the dead time), and instead count photons and place them into count vs. time histograms with custom algorithms implemented with fast GPU-accelerated processing Method and systems of the invention permit accurate counting and temporally resolving of photon arrivals using a threshold peak detection algorithm by directly digitizing an output of an analog o photon sensors by temporally resolving photon arrivals using a thresholded peak detection analysis on the directly digitized output. Counting and temporal resolving are accomplished in real time, allowing immediately display of data, for example. Preferred computational photon counting localizes single- , dual- or multiple photon responses with single photon specificity in real time by peak detection (is a data point above the peak threshold, and above the two data points immediately before and immediately after it?) that can be implemented in real-time with GPU-accelerated processing.

Conventional FLIM acquisition and processing of a single image often takes minutes, and therefore provides no ability to process data in real time. Experimental systems of the invention have demonstrated the ability to collect accurate FLIM images with over a 223% photon rate at 80 MHz=178 Mcps (Mega-counts-per-second) using an HPD. This is more than double the rate of state-of-the-art commercial systems. In the present systems, the >160 Mcps rate is achieved while the system also provides sub-nanosecond time resolution between consecutive photon counts. Present systems can conduct higher —throughput and —dynamic range imaging with real-time GPU-accelerated processing.

In a preferred system the GPU conducts the photon count program in which data is first averaged over an assigned number of laser periods into one single decay per pixel, then normalized by subtracting a minimum value and circularly shifted so that the maximum value aligns with 0 ns, and then averaging or summing of the fluorescence decays of pixels from serially-acquired frames is conducted to increase the fluorescence signal of each pixel, and then a multiphoton microscopy intensity image is calculated as the average value of the decay curve, and the predetermined threshold is used to select pixels of interest for the phasor analysis program.

In a preferred system, the GPU conducts the photon count program in which data is first averaged over an assigned number of laser periods into one single decay per pixel, then normalized by subtracting a minimum value and circularly shifted so that the maximum value aligns with 0 ns, and then a combination of spatial binning and frame averaging or summing of the fluorescence decays of pixels from serially-acquired frames is conducted to increase the fluorescence signal of each pixel, and then then a multiphoton microscopy intensity image is calculated as the average value of the decay curve, and the predetermined threshold is used to select pixels of interest for the phasor analysis program.

A preferred system is a microscopy or imaging system, wherein the photon counting program conducts counting of photons at single-photon sensitivity and estimating their arrival times with respect to a reference clock are needed for the purpose of the microscopy or imaging, including photons generated by secondary processes such as electron emission.

In preferred systems, the photon sensor comprises a PMT or HPD. The digitizer, CPU and GPU are synchronized to an excitation source that stimulates signals at the PMT or HPD. The GPU is programmed to conduct a photon peak event detection in real-time via a photon count program that analyzes the digitized photon sensor output in sampling periods each having at least three consecutive data points to determine a local maximum among the consecutive data points and compare the local maximum to one or more predetermined thresholds to determine whether or not a photon was received in each sampling period, the algorithm providing photon counts to a phasor analysis program in the GPU, wherein the phasor analysis program calculates pixelwise real-time fluorescence lifetime phasor data in real-time and sends the date to the central processing unit. Temporal information of the photon counts is read directly from the digitizer and the photon count program infers temporal alignment from the temporal information. The digitizer conducts digitization of that analog output in a GHz speed and the photon count program in the GPU conducts computational photon counting to retain single-photon specificity. An effective dead time of the digitizer, CPU and GPU can be as small as twice the sampling period, e.g., <1 ns. The one or more predetermined thresholds can be dual thresholds with a lower one of the dual thresholds indicating a single photon in one of the sampling periods and a higher one of the dual thresholds indicating two photons within one of the sampling period. The one or more predetermined thresholds comprise multiple thresholds with a lowest one of the multiple thresholds indicating a single photon in one of the sampling periods and a highest one of the multiple thresholds indicating a highest number of photons associated within one of the sampling periods.

Preferred embodiments of the invention will now be discussed with respect to experiments and drawings. Broader aspects of the invention will be understood by artisans in view of the general knowledge in the art and the description of the experiments that follows.

A preferred embodiment single-photon peak even detection system 100 is shown in FIGS. 1A and 1B as part of a FLIM system 102. The FLIM system 102 up to and including a photon sensor, e.g., a PMT 104, can have conventional optics and a conventional arrangement. A photodiode 106, which could be an external component or incorporated as a part of a laser source 107, monitors the output of the laser source 107 and provides a reference clock synchronization signal to a digitizer 112 after appropriate linear modifications to match the digitizer manufacturer specifications for the reference clock. The laser source 107 provides excitation for the FLIM system 102, and optics to direct excitation to a sample and the photon sensor 104 include respectively: a beam splitter BS; lenses L; a pinhole P; mirrors M, galvanometer scanning mirrors G; a dichroic mirror DM; an objective lens OL that focus excitation on a sample. Emitted energy from the sample is directed by the DM through lens L9 and a filter wheel FW to the PMT 104. In the single-photon peak even detection system 100, the PMT 104's output is amplified with a transimpedance amplifier (TA) 110 and digitized by a digitizer 112. The digitized data is transferred to a central processing unit (CPU) 114 and copied to a graphics processing unit (GPU) 116 for accelerated computational photon counting via single-photon peak event detection (SPEED) algorithm 118. Specifically, digitized data is streamed from CPU 114 to GPU 116 where the SPEED algorithm 118 is implemented, which counts photons and creates a single fluorescence decay curve for each pixel. A preferred phasor analysis algorithm 120 determines intensity, phasor components, and mean lifetime for each pixel, which are copied back to the CPU 114 and displayed in real-time on a display 122. Specifically, the phasor analysis algorithm uses the single fluorescence decay curve for each pixel to compute phasor components g and s, along with the mean fluorescence lifetime, for each pixel via phasor analysis. Phasor analysis provides fast processing and the additional benefit of examining multi-exponential decay fluorescence lifetime data on a 2D phasor/polar plot.

The SPEED processing 118 determines a local maximum (a datapoint that has a larger value than the point immediately before and after it) preferably from a window of three datapoints. Larger windows (with multiple datapoints before and after a datapoint under consideration) can be used, as discussed above, with the drawback of larger dead time and the potential advantage of better sensitivity in noisy environments. The number of photons attributed to the local maximum depends on threshold(s).

FIG. 1B shows signals represented on normalized scales of intensity vs. time at respective locations from top to bottom of the PD 106 (excitation), the sample (emission), the PMT 104, the TA 110, the digitize 112 and the SPEED algorithm 118 (counts). Example raw data from a sample of urea crystals is shown in the "Digitizer" column; the signals displayed in the four preceding boxes are estimations based on the digitized data and the "Photon counts" were computed using SPEED. Single pulse (12.5 ns) and single pixel (625 ns) signals are given in the left and right columns.

Figures 2A, 2B, 2C:
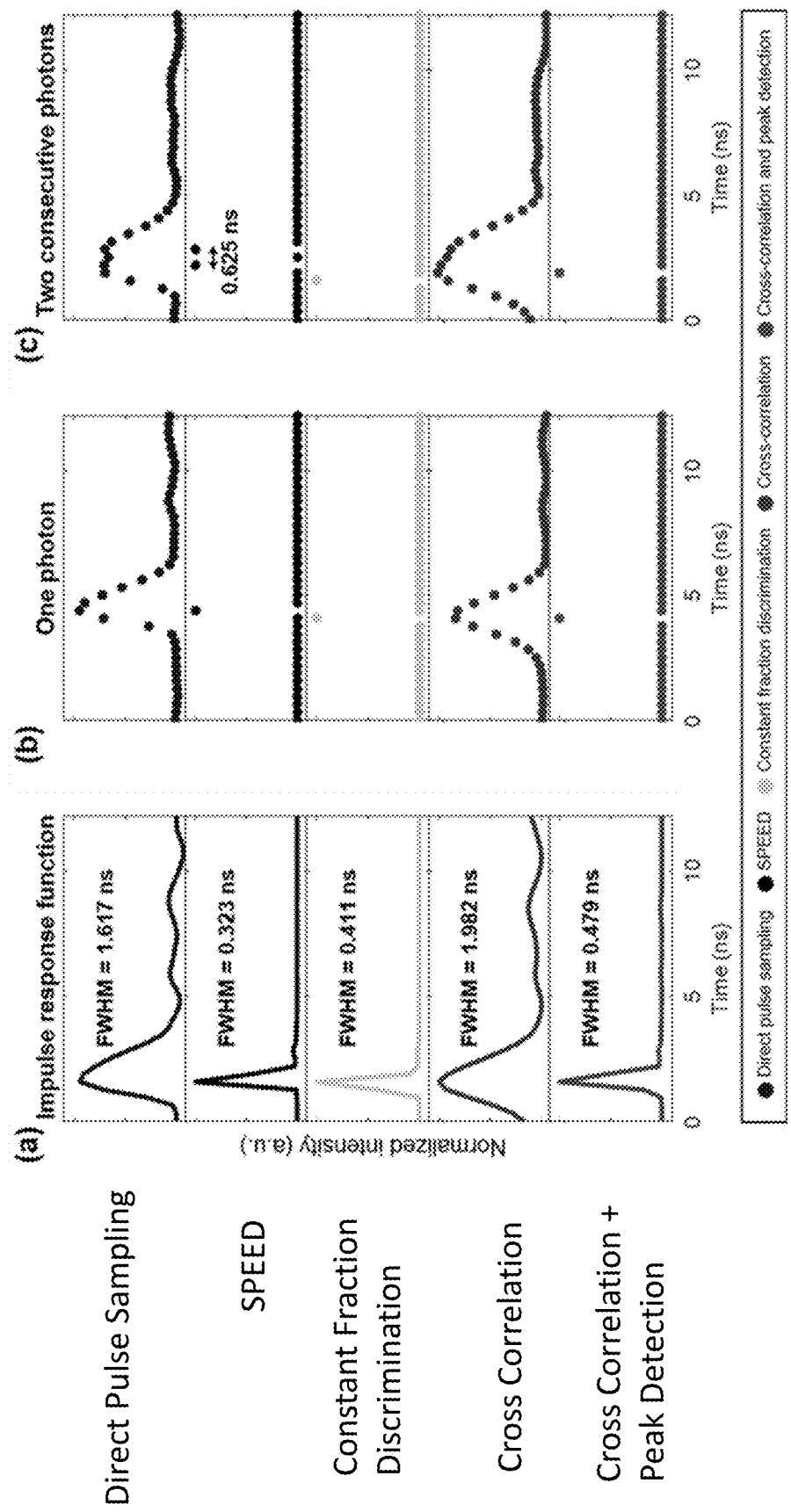
FIGS. 2A-2C compares the performance of the FIGS. 1A-1B system to prior techniques used in FLIM.

FIGS. 2A-2C compares the performance of the present SPEED processing to prior techniques and demonstrates that the present invention can detect two consecutive photons only 0.625 ns apart, while the prior techniques will only detect one of the two consecutive photons (FIG. 2C). FIG. 2A shows Impulse response function (IRF), calculated as the average pixel decay resultant from imaging second harmonic generation from a BBO crystal, for the five computational analysis techniques performed on the same set of digitized data: direct pulse sampling, SPEED, constant fraction discrimination, cross-correlation with direct pulse sampling IRF, and cross-correlation with direct pulse sampling IRF followed by peak detection. The full width at half-maximum (FWHM) is given in ns for each technique. FIG. 2B is an example of resultant data from each technique when used to analyze a single photon response of the photomultiplier tube (PMT) from experimental data. FIG. 2C is an example of resultant data from each technique when used to analyze two photons separated by <1 ns incident on the PMT from experimental data. The photons are separated by two times the sampling period, or 0.625 ns, using SPEED, which is the only method that detects both consecutive photons. The second photon in each of the other techniques is missed in the dead time inherent to the methods.

The FIGS. 1A-1B system functions very well. Testing revealed that certain sample concentrations, e.g. concentrations of NADH above 20 mM, the fluorescence lifetime estimated using SPEED rises significantly due to undercounting photons that arrive during the dead time (approximately 0.625 ns for SPEED). This biases the fluorescence lifetime longer when many photons per laser pulse arrive at the detector: the first photon to arrive is counted, the photons arriving within less than 0.625 ns of the first photon are not counted, and later-arriving photons are counted. These later-arriving photons then make up a relatively higher share of the photons used to estimate fluorescence lifetime, which biases estimated lifetimes to higher values.

Preferred embodiments use a dual or multiple thresholds, i.e., a first threshold for single photon arrivals and a second or additional thresholds for multiple photon arrivals. This method produced modestly improved results in terms of intensity linearity but did not improve the range of NADH concentrations in which fluorescence lifetime is within 10% error. Systems of the invention with a hybrid detector, such as HPDs, as the photon sensor can employ a multi-threshold approach that leverages the hybrid detector with more well-established discrete output levels for simultaneous multiple photon arrival events. Single threshold operation using a PMT counts a max of 1 photon per peak. HPD permits multi-threshold models because semi-discrete populations can be resolved (see FIG. 5B) Using multiple thresholds with HPD means each peak can be accurately counted, for example as 0-5 photons. This means that more photons can be counted faster.

Figure 3A:
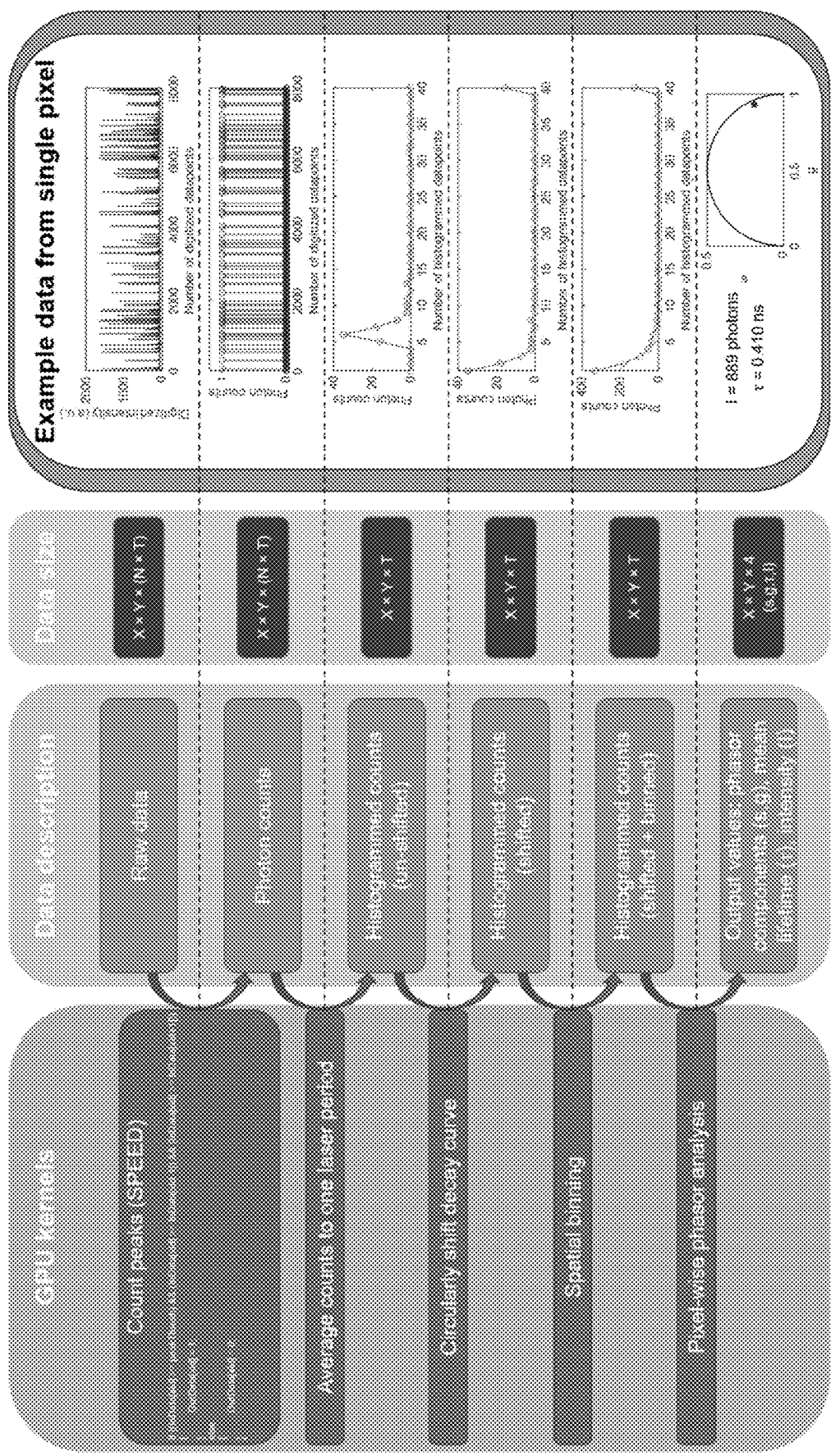
FIG. 3A is a flowchart of the processing conducted in a preferred GPU of the FIGS. 1A-1B system.

FIG. 3A is a flowchart of the processing conducted in a preferred GPU 116 using any of the PMT with single threshold, dual threshold or multi-threshold embodiments for the SPEED 118 and phasor 120 analyses. Directly digitized raw data is analyzed to output intensity (I), lifetime (τ), and phasor components (s,g). Photon counting using SPEED is performed in the first kernel ("Count peaks"), where each digitized datapoint is classified as a photon count if it is above the peak threshold (peakThresh) and greater than the datapoint immediately before and after it. For multi-threshold photon counting, empirically determined thresholds for a given detector can be used to discriminate between peaks that correspond to the detector response to more than one photon. Multiple different peak threshold values can be used with each one corresponding to a different number of photons. Following photon counting and localization, photon counts for each pixel are histogrammed into a plot of photon counts vs. time bin ("Average counts to one laser period"), shifted so that the maximum value falls at time=0 ns ("Circularly shift decay curve"), spatially binned with neighboring pixels ("Spatial binning"), and then pixel-wise phasor analysis is performed to compute the output lifetime and phasor components. X, number of pixels in X; Y, number of pixels in Y; N, number of laser pulses per pixel (N=200 for example pixel); T, number of digitized datapoints per pixel (T=40 for example pixel).

Figure 3B:
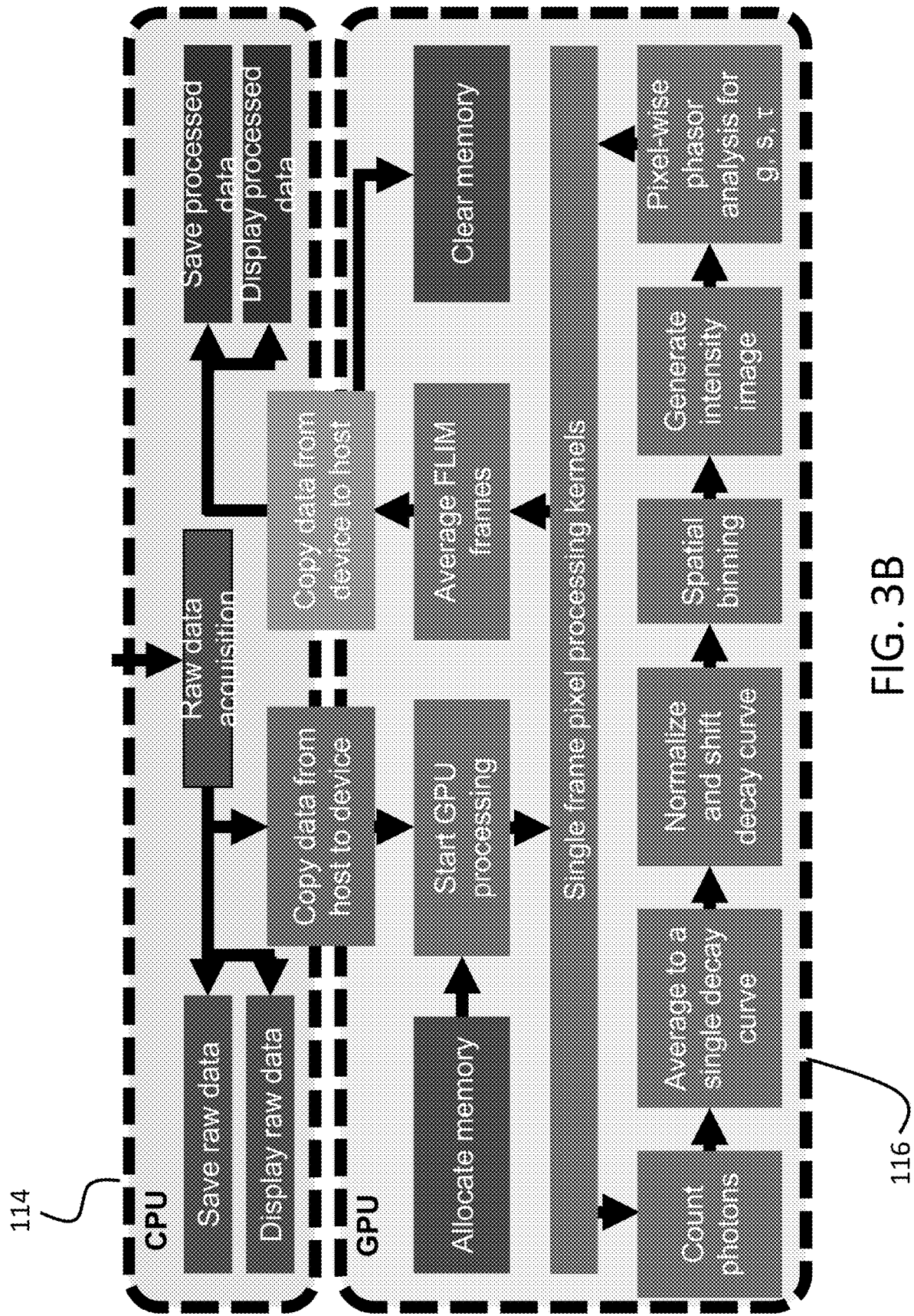
FIG. 3B shows example communications flow between the CPU and the GPU the FIGS. 1A-1B system.
Figure 3C:
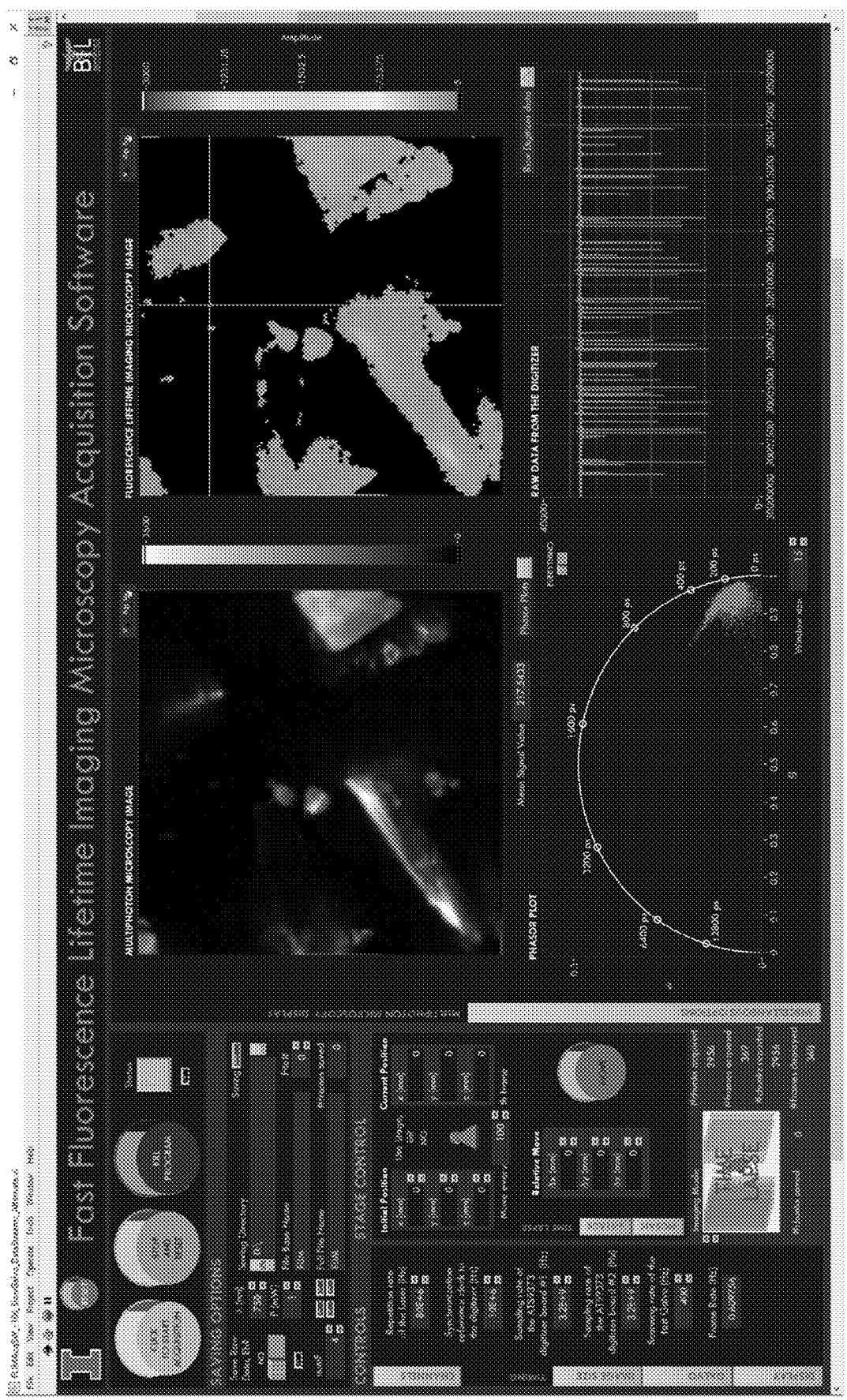
FIG. 3C shows a preferred graphical user interface (GUI) for the FIGS. 1A-1B system.

FIG. 3B shows example communications flow between the CPU 114 and the GPU 116. The GPU 116 can be leveraged to accelerate the calculation of multiphoton intensity, phasor components (g and s), and mean fluorescence lifetime (τ) of each pixel in real-time during image acquisition rates up to 25 fps. Additional factors such as a minimum intensity threshold for fluorescence lifetime calculation, spatial binning, and frame averaging can be input as well. In an experiment, data acquisition was controlled through a custom LabVIEW (National Instruments) program, including a graphics user interface (GUI) where the resulting images and phasor plot were displayed as shown in FIG. 3C. The GUI in FIG. 3C is shown displaying the control panel (left), multiphoton intensity (top middle) and fluorescence lifetime (top right) images of the whole field-of-view (128×128 μm), along with a pixelwise phasor plot (bottom middle). A sample of raw data from the digitizer is displayed in red (bottom right). Any of the raw data or estimated parameters available at the CPU 114 can also be saved to long term memory.

Figure 4A:
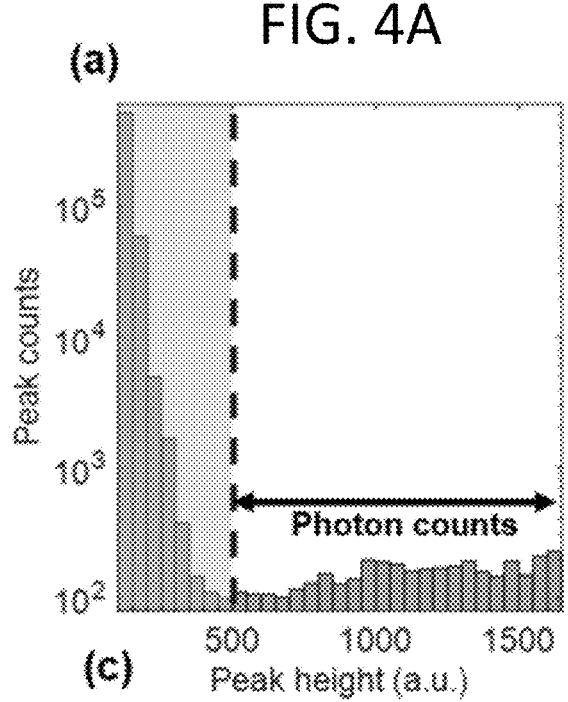
FIGS. 4A-4E show preferred photon count program operations conducted in the GPU of FIGS. 1A-1B for single-threshold photon peak discrimination.
Figure 4B:
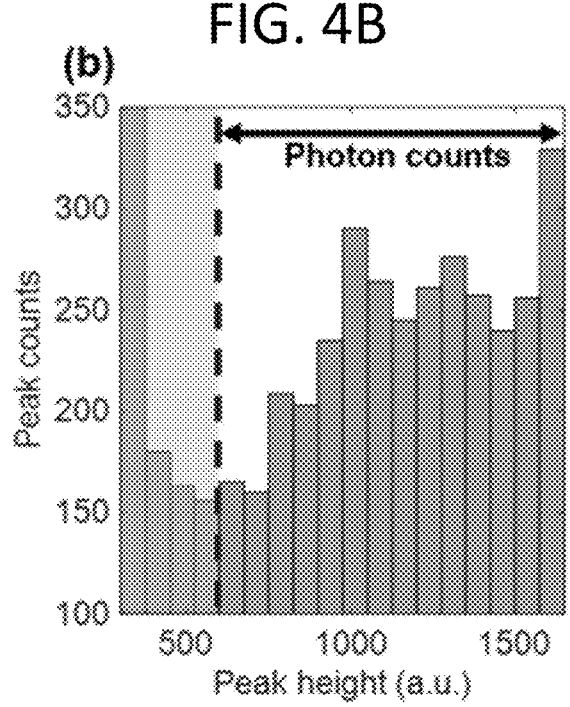
Figure 4C:
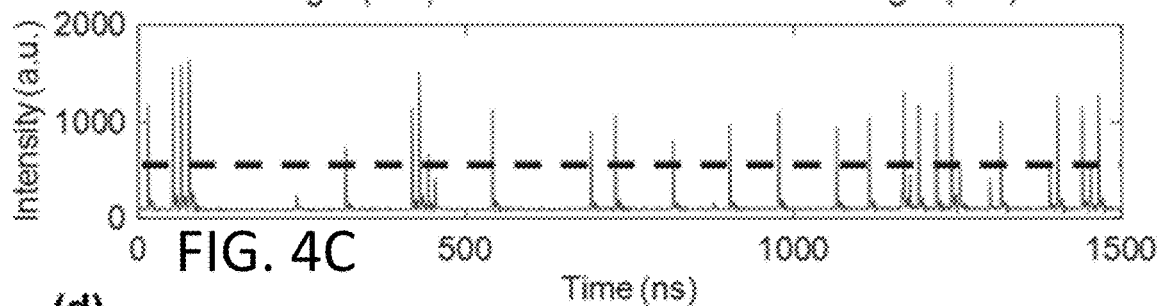
Figure 4D:
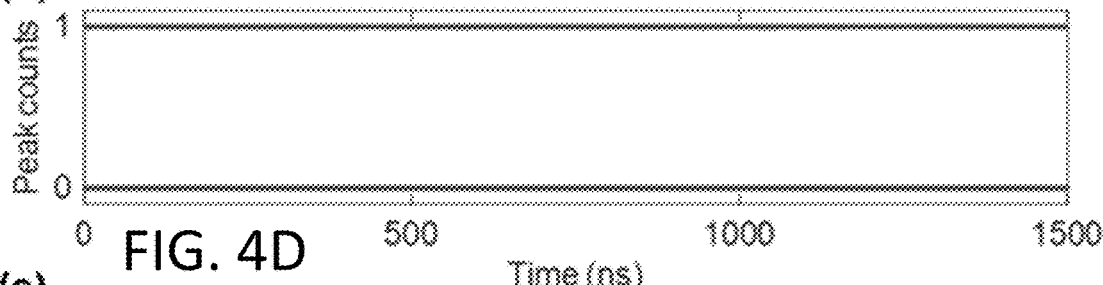
Figure 4E:
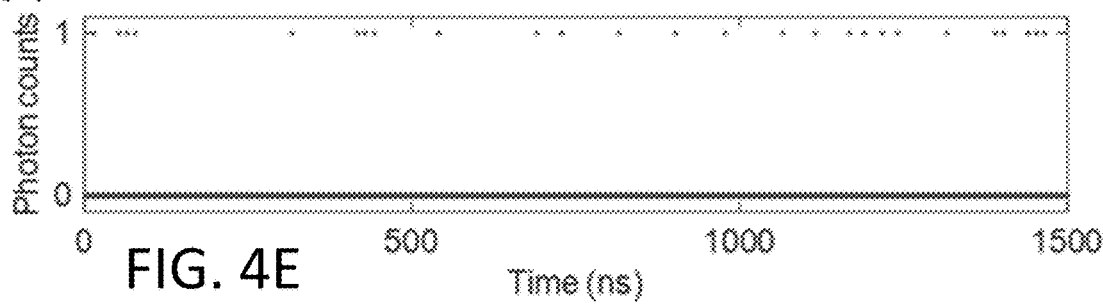

FIGS. 4A-4E show the SPEED analysis 118 with single-threshold photon peak discrimination. FIG. 4A is a logarithmic histogram of a number of detected peaks in digitized data and the values of those peaks, in arbitrary units. Peaks, digitized datapoints that were higher than the datapoints immediately before and after it, were determined from raw digitized data from 2 mM NADH in solution. FIG. 4B shows a zoomed-in non-logarithmic histogram focused on region with peaks corresponding to photon counts. The excess noise factor ($F_e$), was calculated as the normalized second moment of the photon count peak height distribution, and was determined to be approximately 1.25. The experimentally determined minimum photon peak height was set at 575 a.u., which is controlled by on the PMT control voltage, amplifier, digitizer DC offset, and any normalization on digitized data, and is indicated with a dashed line. Datapoints with a peak height above a predetermined minimum photon peak height are considered photon counts by the SPEED analysis 118. FIG. 4C shows example intensity over time of raw digitized data, with the dashed threshold for photon counts. All peaks from FIG. 4C are shown in FIG. 4D, and all photon counts from FIG. 4C are shown in FIG. 4E.

Figure 4F:
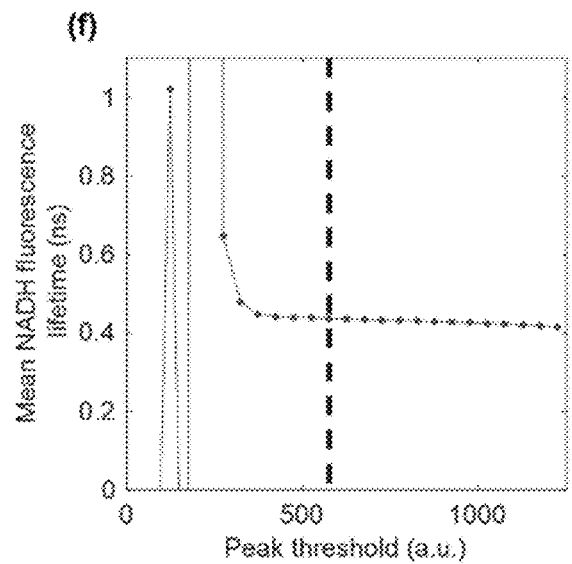
FIGS. 4F-4I show data of experiments to determine a threshold used in the FIGS. 1A-1B system;.
Figure 4G:
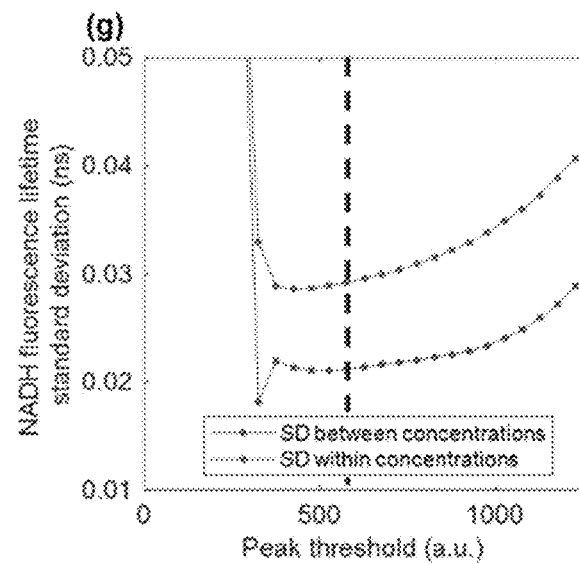
Figure 4H:
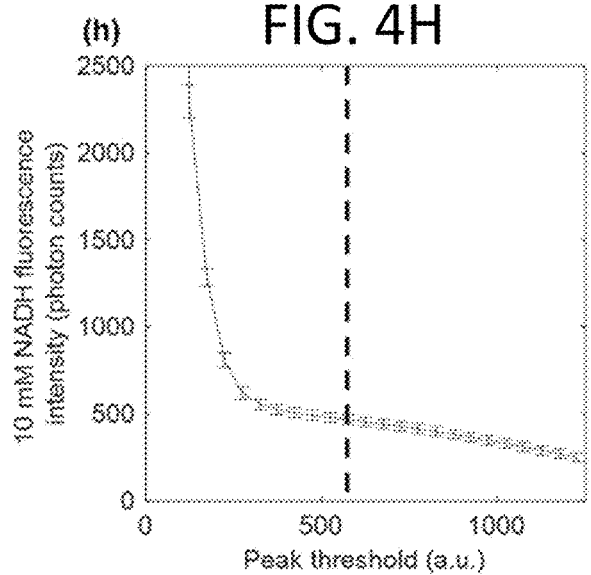
Figure 4I:
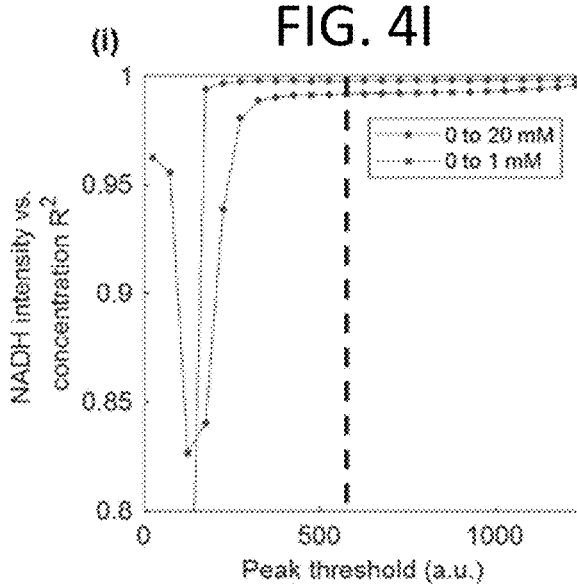

To determine the effect of changing the peak discrimination threshold, thresholds from 25 to 1225 a.u. were tested for NADH fluorescence lifetime accuracy (FIG. 4F), fluorescence lifetime standard deviation (FIG. 4G), intensity (FIG. 4I), and linear dependence of intensity on concentration. The results in FIGS. 4A and 4B show that a range of 475-675 a.u. is a reasonable peak discrimination threshold, with the minimum value falling at 575 a.u. Peak discrimination thresholds below around 400 a.u. are highly susceptible to counting false peaks and do not produce accurate or precise results. In FIG. 4H, there is a 10.2% difference between the NADH intensity in photon counts calculated using 475 and 675 a.u. as the peak discrimination threshold. As the threshold goes to higher values, more photon peaks are missed, and as the threshold goes to lower values, more noise peaks are classified as photon counts. With fewer photons counted, the fluorescence lifetime standard deviation in FIG. 4G increases as the peak threshold increases. The calculated fluorescence lifetime in FIG. 4F and $R^2$ values for a linear fit between intensity (in photon counts) and NADH concentration FIG. 4I are very robust and do not have a large dependence on the peak discrimination threshold.

Figures 5A, 5B, 5C:
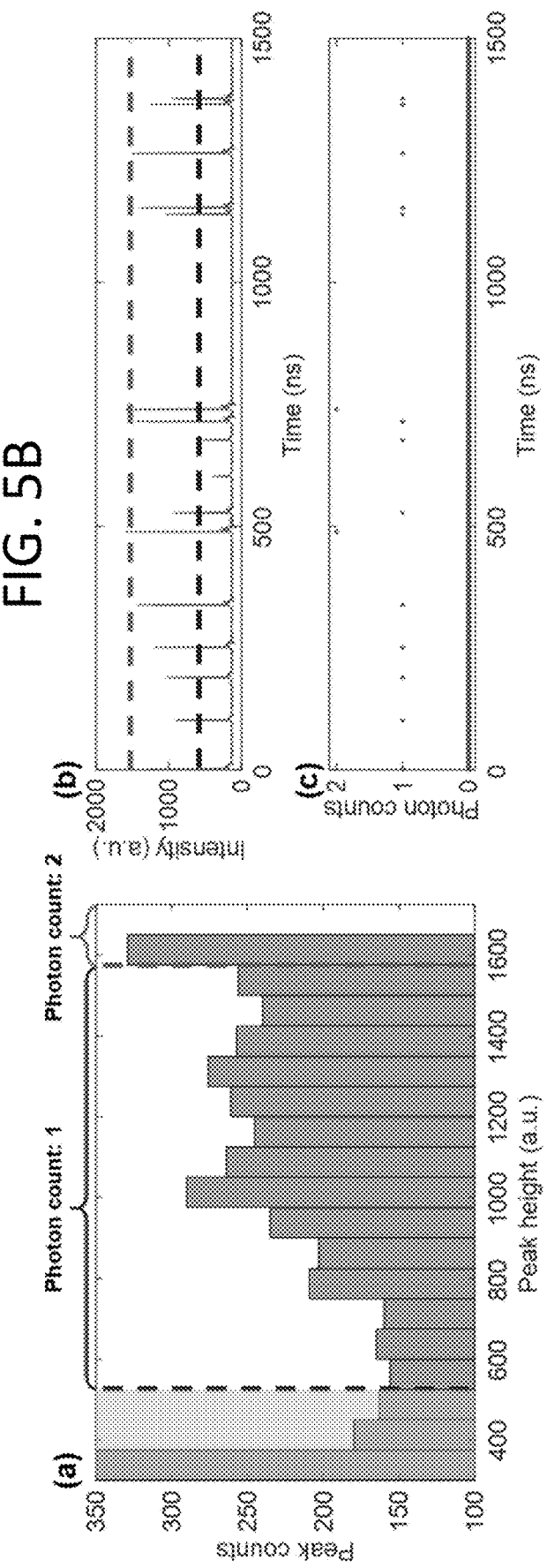
FIGS. 5A-5C show preferred photon count program operations conducted in the GPU of FIGS. 1A-1B for dual-threshold photon peak discrimination.

FIGS. 5A-5C show the SPEED analysis 118 modified to include dual-threshold photon peak discrimination. In FIG. 5A, the histogram is focused on a region with peaks corresponding to one photon count (550 a.u. to 1575 a.u.) and two photon counts (about 1575 a.u.). The minimum peak threshold for a single photon count at 550 a.0 and the second threshold for a photon count of two at 1575 a.u are represented by dashed lines in FIG. 5A and 5B. FIG. 5B shows example intensity over time of raw digitized data, and FIG. 5C shows the photon counts of 0, 1, or 2 obtained from the dual-threshold peak discrimination.

Figure 5D:
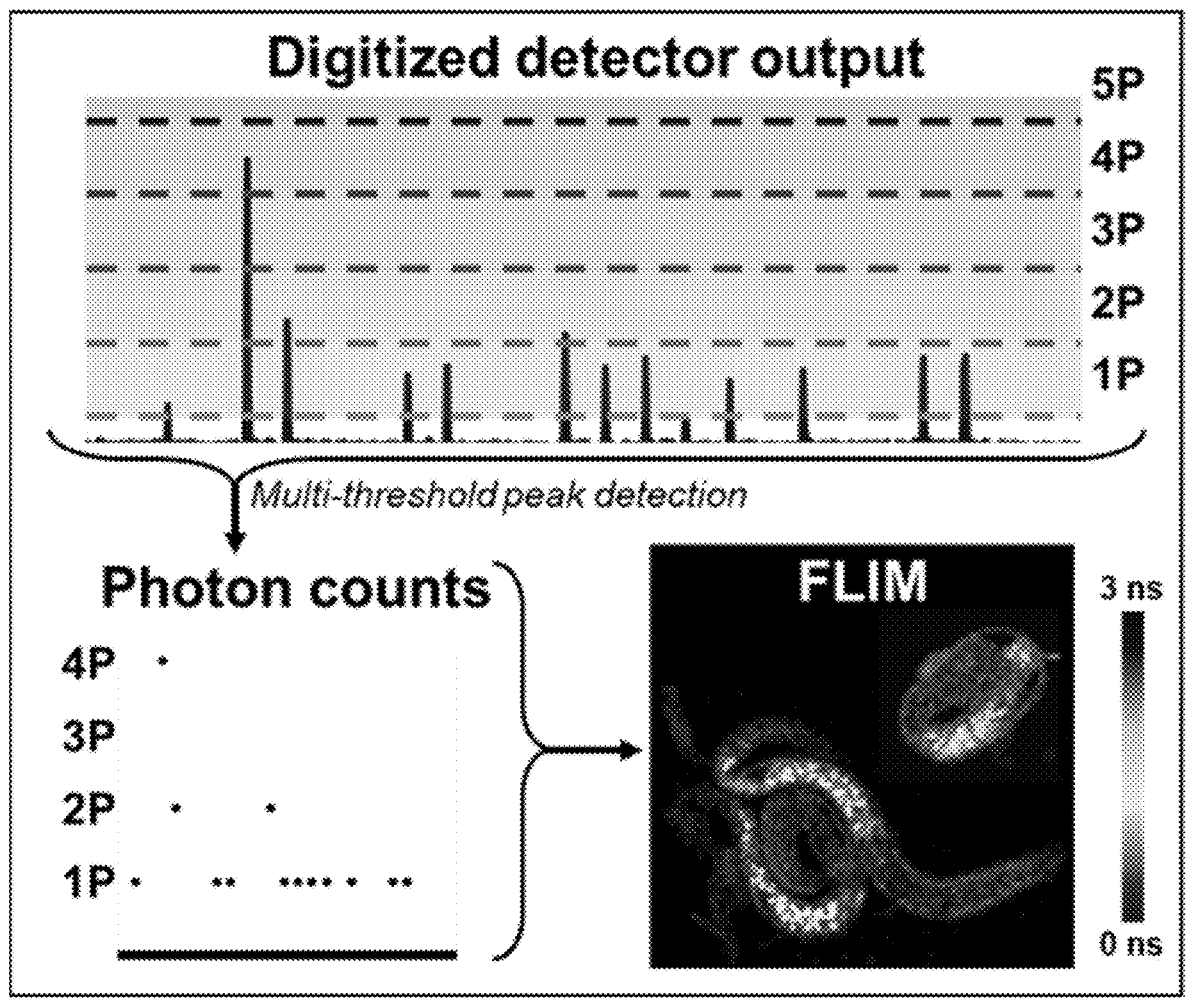
FIGS. 5D show preferred photon count program operations conducted in the GPU of for multi-threshold photon peak discrimination.

FIG. 5D shows the SPEED analysis 118 modified to include multi-threshold photon peak discrimination, which is enabled by use of an HPD (as in FIG. 6 below). HPDs have a two-step amplification process consisting of electron bombardment and then avalanche gain, which leads to lower gain variability and a more linear dependence of signal on number of incident photons compared to PMTs. HPDs can be used for multi-photon responses. Present systems leverage this capability for computational photon counting to count multiple photons arriving at the HPD within the detector response time. In FIG. 5D, five photon thresholds are applied. Different thresholds are counted in the SPEED analysis 118 has having any of 0 to 5 photons in the detector response period.

Experimental System of FIGS. 1A and 1B.

The system of FIGS. 1A and 1B was implemented experimentally and tested. Preferred hardware details are given here. The laser 107 was a tunable 80 MHz mode-locked Ti:Sapphire laser (Mai Tai HP, Spectra-Physics) for two-photon excitation; tuned to 750 nm for NAD(P)H excitation. The 80 MHz laser signal is measured by a photodiode (PD, Thorlabs), downsampled to 10 MHz (Clock divider, Pulse research labs), and used to synchronize the acquisition and scanning electronics using phase-locked loop. Two galvanometer mirrors (G1, G2, Cambridge Technology) are used for beam scanning. A 1.05 NA objective lens (OL, XLPLN25XWMP2, Olympus) is used to deliver the excitation beam and to collect fluorescence emission. The emitted fluorescence is directed through a bandpass filter, mounted in a filter wheel (FW), incident on the PMT (H10721-210, Hamamatsu), amplified with a transimpedance amplifier (TA, C5594, Hamamatsu), and directly digitized by a 12-bit, 3.2 GHz digitizer (ATS9373, AlazarTech). The PMT was supplied with a control voltage of +1.0 V to achieve optimal pulse linearity, according to manufacturer specifications. Digitized data is streamed from the random-access memory of the computer to the graphics processing unit (GPU, GeForce RTX 2080, NVIDIA), where implemented the SPEED algorithm to count photons and create a single fluorescence decay curve for each pixel. From this decay curve, phasor components g and s are computed, along with the mean fluorescence lifetime, for each pixel via phasor analysis. Phasor analysis provides fast processing and the additional benefit of examining multi-exponential decay fluorescence lifetime data on a 2D phasor/polar plot. Intensity, fluorescence lifetime, and a pixelwise phasor plot are displayed in real time on a LabVIEW (National Instruments) graphical user interface.

Figure 6:
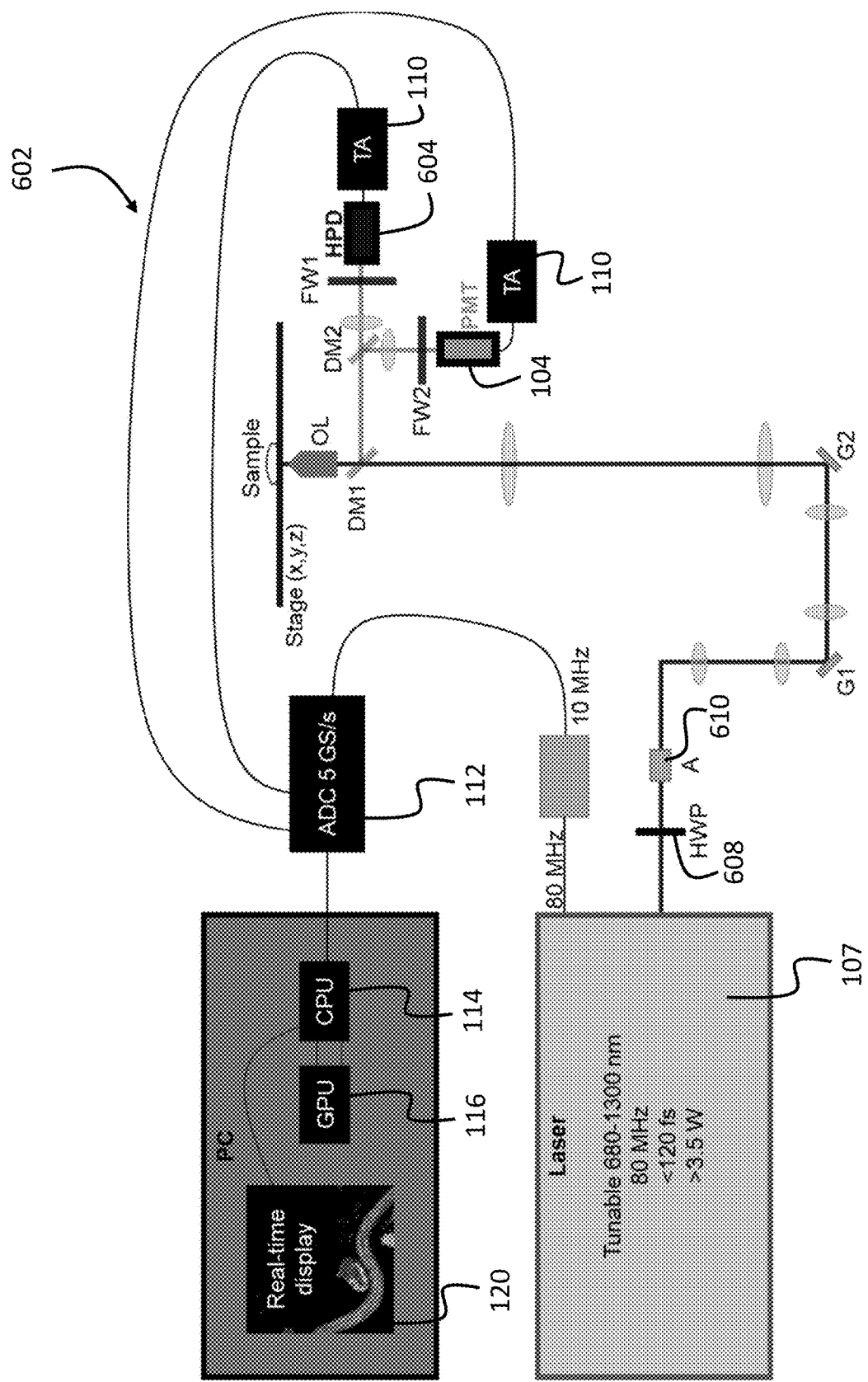
FIG. 6 shows a preferred FLIM system that uses a hybrid photon detector (HPD) in addition to a PMT.

FIG. 6 shows a preferred FLIM system 602 that uses a hybrid photon detector HPD 604 in addition to a PMT 104. This was an experimental set-up to test the PMT 104 against the HPD 604. The HPD 604 enables use of multi-threshold analysis by the SPEED algorithm 118 as shown in FIG. 5D, implemented in the GPU 116 as in the FLIM system 102, and like components are labelled with the same reference numbers used in FIG. 1A. The FLIM system was experimentally implemented using a pulsed laser 107 at 80 MHz and direct digitization 112 of detector outputs from the PMT 103 and the HPD 604. The laser signal enters the optical path via a half wave plate 608 and attenuator 610. The HWP 608 can be used to rotate the polarization of the light. The attenuator 610 (a Glan-Thompson polarizing prism in the experimental set-up) only allows one polarization of light to pass through, and can control the laser power delivered to the sample. The repetition rate of the laser 107 was downsampled to a 10 MHz clock to synchronize the ADC 112 and therefore the data acquisition. Synchronization can be achieved by inferring temporal alignment of data with the laser pulse. This can be done by examining the resultant fluorescence decay and assigning the maximum value of a fluorescence decay (where the fluorescence decay used is the sum of all photons collected in either each line or each pixel) to be aligned with the laser pulse. Photon counts are cut into temporal, e.g. 25 ns, segments that are summed together to form the resultant decay curves. Since each line of data is acquired continuously and contains many more photons than each single pixel of data, using the maximum value in each line in each temporal segment to shift data provides more accurate results, especially at low photon rates.

Two galvanometer mirrors G1 and G2 are used to scan the beam on the sample to sequentially excite each pixel. The sample can be translated in three dimensions to choose the optimal location for imaging or take mosaics. Emitted fluorescence below 665 nm is directed by a dichroic mirror DM1 toward the hybrid 604 and PMT 104 detectors. A removable dichroic mirror box DM2 is used to direct signal to either the HPD 604 or the PMT 104, both of which are equipped with filter wheels FW1 and FW2 with different bandpass filters for selection of spectral bands. The DM2 was part of the experimental set-up, which allowed testing the PMT 104 and the HPD 604 separately. Signals from the detectors are amplified by a 20 dB, 2.5 GHz bandwidth transimpedance amplifiers 110, and then directly digitized by the ADC 112 at 5 GS/s. Raw data can be saved directly for system characterization analysis, and/or processed on the GPU 116 for real-time display and saving of processed data.

Figure 7:
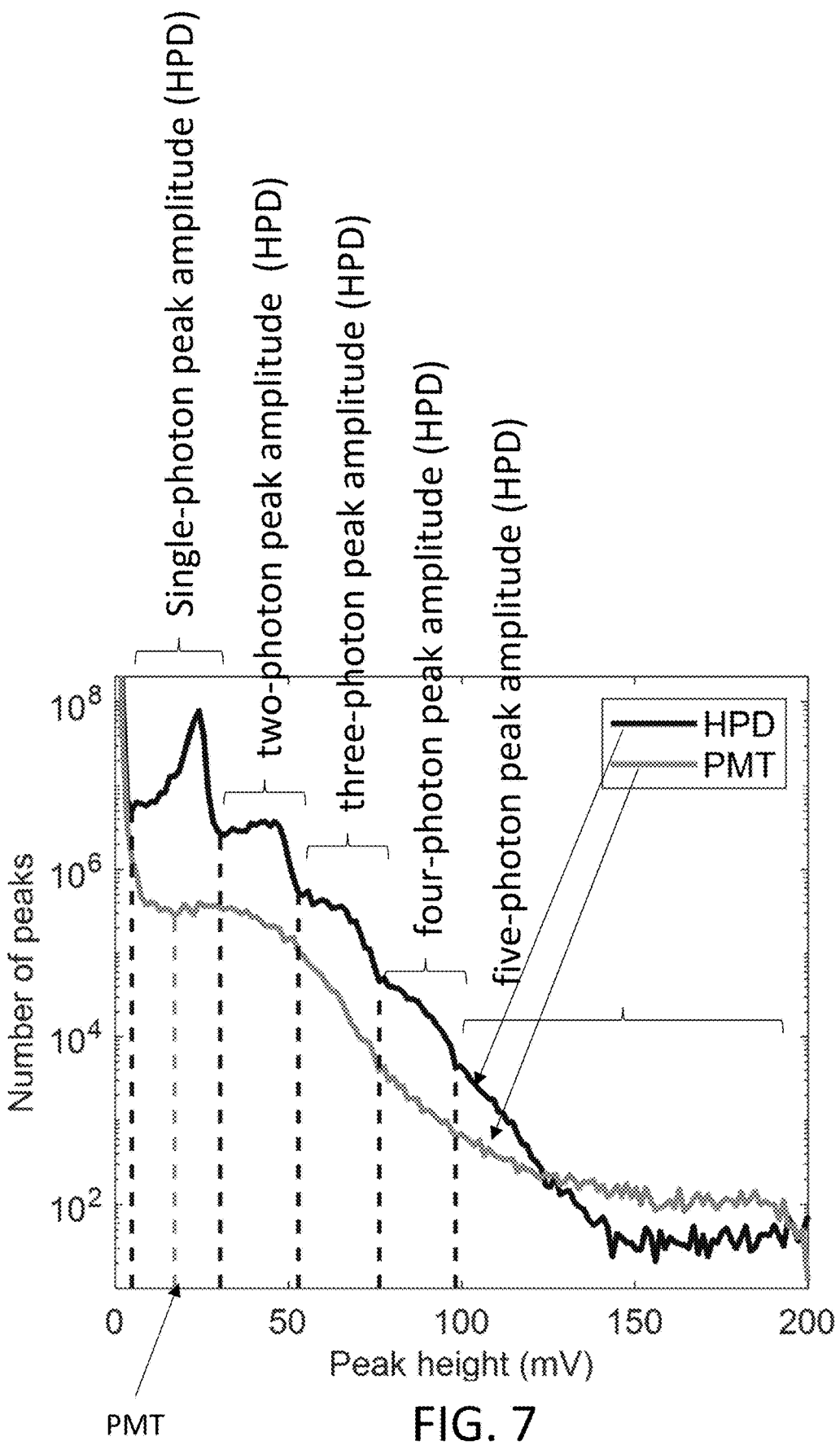
FIG. 7 shows the ability of the HPD to resolve multiple peaks for consecutive photons with a multiple thresholds.

FIG. 7 shows multiple dashed line for HPD, and a single dashed line for PMT (labelled). The dashed lines represents the peak threshold value for 1 photon in the case of the PMT, while the HPD multiple thresholds provide the ability to resolve 0-5 photons. The HPD provides the ability with the SPEED program 118 to resolve peaks corresponding to multiple photons arriving at the detector within the detector response time (e.g., <0.2 ns).

Digitizing the PMT 104 or hybrid photon detector 604 output at 3.2-5 GHz has the challenging consequence of generating multiple gigabytes of data within seconds, which limits the amount of raw data that can reasonably be acquired in an imaging session and requires considerable time to process. For this reason, preferred methods decrease output file size from raw data (for example: 256×256×16000 as X×Y×Time) to four 256×256 images (intensity, fluorescence lifetime, g, and s), which provides a significant benefit for the user in terms of time, convenience, and computer memory space. For imaging at 0.61 fps, raw data from a single frame was compressed 2640 times. With versatility in mind, the user was able to select on the GUI if they would like to save raw data, processed data, both, or neither. Image parameters and notable metrics related to raw data size, processed data size, acquisition time, and processing time of a single frame are listed in Table 1 comparing the time for processing using direct pulse sampling and SPEED. The total time to copy data to and from the GPU and process data on the GPU was about ⅓ of the time to acquire a single frame.

TABLE 1

Single frame acquisition, processing, and timing

| Method | Direct pulse sampling [1] | SPEED |
|---|---|---|
| Raw data dimensions (x × y × t) | 256 × 256 × 16000 | 256 × 256 × 16000 |
| Raw data size (MB) | 2097.15 | 2097.15 |
| Processed data size (MB) | 0.79 | 5.75 |
| Processed data files and dimension | Intensity (256 × 256) | Intensity (256 × 256) |
| | Mean lifetime (256 × 256) | Mean lifetime (256 × 256) |
| | g (256 × 256) | g (256 × 256) |
| | s (256 × 256) | s (256 × 256) |
| | N/A | Fluorescence decay (256 × 256 × 40) |
| Pixel rate (MHz) | 0.2 | 0.2 |
| Frame acquisition time (ms) | 1639.34 | 1639.34 |
| Host to device memory copying time (ms) | 459.90 | 459.90 |
| Device to host memory copying time (ms) | 0.06 | 0.66 |
| GPU all kernels processing time (ms) | 66.20 | 88.82 |
| Kernel: "Peak detection" processing time (ms) | N/A | 51.58 |
| Kernel: "Average to a single decay curve" processing time (ms) | 63.16 | 33.99 |
| Total processing + data copying time (ms) | 526.16 | 539.78 |

The direct collection of data in the time-domain in the FIGS. 1A and FIG. 6 systems enables the exploration of different strategies in image processing and fluorescence lifetime estimation. Presently, by collecting the fluorescence decay for each pixel, the systems are able to perform spatial binning on the fluorescence decays prior to phasor analysis, which increases the number of photons used for each pixel's fluorescence lifetime estimation and improves the accuracy. This versatility in data processing is enabled by the direct digitization in the time-domain and would be unavailable in a frequency-domain FLIM system using analog electronics to perform phasor analysis.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A photon peak event detection system that accepts an analog output from a photon sensor, comprising:
    an amplifier to amplify the analog output from the photon sensor;
    a digitizer to directly digitize the raw analog output from the photon sensor after its amplification by the amplifier and provide a directly digitized photon sensor output;
    a central processing unit (CPU) to receive the directly digitized photon sensor output;
    a graphics processing unit (GPU) programmed to conduct a photon peak event detection in real-time via a photon count program that analyzes the directly digitized photon sensor output in sampling periods each having at least three consecutive data points to determine a local maximum among the consecutive data points and compare the local maximum to one or more predetermined thresholds to determine whether or not a photon was received in each sampling period, the algorithm providing photon counts to a phasor analysis program in the GPU, wherein the phasor analysis program calculates pixelwise fluorescence lifetime phasor data in real-time and sends the data to the central processing unit; and
    a display that displays one or more of the phasor data and photon counts in real-time.

2. The system of claim 1, wherein the photon sensor comprises a photomultiplier tube (PMT).

3. The system of claim 2, wherein the digitizer, CPU and GPU are synchronized to an excitation source that stimulates signals at the PMT.

4. The system of claim 3, wherein temporal information of the photon counts is read directly from the digitizer and the photon count program infers temporal alignment from the temporal information.

5. The system of claim 3, wherein the digitizer conducts digitization of that analog output in a GHz speed and the photon count program conducts computational photon counting to retain single-photon specificity.

6. The system of claim 3, wherein an effective dead time of the digitizer, CPU and GPU is twice the sampling period.

7. The system of claim 6, wherein the effective dead time is <1 ns.

8. The system of claim 3, wherein the at least three consecutive data points comprises more than three consecutive data points.

9. The system of claim 1, wherein the photon sensor comprises a hybrid photon detector (HPD).

10. The system of claim 9, wherein the digitizer, CPU and GPU are synchronized to an excitation source that stimulates signals at the HPD.

11. The system of claim 10, wherein temporal information of the photon counts is read directly from the digitizer and the photon count program infers temporal alignment from the temporal information.

12. The system of claim 10, wherein the digitizer conducts digitization of that analog output in a GHz speed and the photon count program conducts computational photon counting to retain single-photon specificity.

13. The system of claim 10, wherein an effective dead time of the digitizer, CPU and GPU is twice the sampling period.

14. The system of claim 13, wherein the effective dead time is <1 ns.

15. The system of claim 10, wherein the at least three consecutive data points comprises more than three consecutive data points.

16. The system of claim 10, wherein the one or more predetermined thresholds comprise multiple thresholds with a lowest one of the multiple thresholds indicating a single photon in one of the sampling periods and a highest one of the multiple thresholds indicating a highest number of photons associated within one of the sampling periods.

17. The system of claim 9, wherein the HPD is a sensor in a fluorescence lifetime imaging microscopy (FLIM) system including a pulsed laser source and optics to generate a signal after interaction with a sample and to direct that signal to the HPD.

18. The system of claim 1, wherein the photon sensor is a sensor in a fluorescence lifetime imaging microscopy (FLIM) system including a pulsed laser source and optics to generate a signal after interaction with a sample and to direct that signal to the photon sensor.

19. The system of claim 1, wherein data is continuously streamed between the CPU and the GPU.

20. The system of claim 1, wherein the phasor analysis program determines intensity, phasor components, and mean lifetime for each pixel, which are copied back to the CPU and displayed in real-time on the display.

21. The system of claim 20, wherein the phasor analysis program uses the a single fluorescence decay curve for each pixel to compute phasor components g and s, equivalent to the coefficients of the sine and cosine components of the Fourier series of the curve estimated at the modulation frequency or a higher harmonic thereof, along with the mean fluorescence lifetime, for each pixel via phasor analysis.

22. The system of claim 1, wherein the GPU conducts the photon count program as a first kernel, the photon counts for each pixel are histogrammed into a plot of photon counts vs. time bin, shifted so that the maximum value falls at time =0 ns, spatially binned with neighboring pixels, and then the phasor analysis program conducts pixel-wise phasor analysis is performed to compute the output lifetime and phasor components; X, number of pixels in X; Y, number of pixels in Y; N, number of laser pulses per pixel and T, number of digitized datapoints per pixel.

23. The system of claim 1, wherein the GPU conducts the photon count program in which data is first averaged over an assigned number of laser periods into one single decay per pixel, then normalized by subtracting a minimum value and circularly shifted so that the maximum value aligns with 0 ns, and then spatial binning of the fluorescence decays is conducted to increase the collected fluorescence signal for each pixel, and then a multiphoton microscopy intensity image is calculated as the average value of the decay curve, and the predetermined threshold is used to select pixels of interest for the phasor analysis program.

24. The system of claim 1, wherein the GPU conducts the photon count program in which data is first averaged over an assigned number of laser periods into one single decay per pixel, then normalized by subtracting a minimum value and circularly shifted so that the maximum value aligns with 0 ns, and then averaging or summing of the fluorescence decays of pixels from serially-acquired frames is conducted to increase the fluorescence signal of each pixel, and then then a multiphoton microscopy intensity image is calculated as the average value of the decay curve, and the predetermined threshold is used to select pixels of interest for the phasor analysis program.

25. The system of claim 1, wherein the GPU conducts the photon count program in which data is first averaged over an assigned number of laser periods into one single decay per pixel, then normalized by subtracting a minimum value and circularly shifted so that the maximum value aligns with 0 ns, and then a combination of spatial binning and frame averaging or summing of the fluorescence decays of pixels from serially-acquired frames is conducted to increase the fluorescence signal of each pixel, and then then a multiphoton microscopy intensity image is calculated as the average value of the decay curve, and the predetermined threshold is used to select pixels of interest for the phasor analysis program.

26. The system of claim 1, in a microscopy or imaging system, wherein the photon counting program conducts counting of photons at single-photon sensitivity and estimating their arrival times with respect to a reference clock are needed for the purpose of the microscopy or imaging, including photons generated by secondary processes such as electron emission.

27. A photon peak event detection system that accepts an analog output from a photon sensor, comprising:
  an amplifier to amplify the analog output from the photon sensor;
  a digitizer to digitize the analog output from the photon sensor after its amplification by the amplifier and provide digitized photon sensor output;
  a central processing unit (CPU) to receive the digitized photon sensor output;
  a graphics processing unit (GPU) programmed to conduct a photon peak event detection in real-time via a photon count program that analyzes the digitized photon sensor output in sampling periods each having at least three consecutive data points to determine a local maximum among the consecutive data points and compare the local maximum to one or more predetermined thresholds to determine whether or not a photon was received in each sampling period, the algorithm providing photon counts to a phasor analysis program in the GPU, wherein the phasor analysis program calculates pixel-wise fluorescence lifetime phasor data in real-time and sends the data to the central processing unit; and
  a display that displays one or more of the phasor data and photon counts in real-time, wherein the digitizer, CPU and GPU are synchronized to an excitation source that stimulates signals at the PMT, wherein the photon sensor comprises a photomultiplier tube (PMT), and wherein the one or more predetermined thresholds comprise at least two thresholds with a lower one of the at least two thresholds indicating a single photon in one of the sampling periods and a higher one of the at least two thresholds indicating two photons within one of the sampling periods.

* * * * *